United States Patent
Stuart et al.

(10) Patent No.: US 10,006,405 B2
(45) Date of Patent: Jun. 26, 2018

(54) THRUST REVERSER SYSTEM WITH TRANSLATING-ROTATING BLOCKER DOORS AND METHOD OF OPERATION

(71) Applicant: General Electric Company, Schenectady, NY (US)

(72) Inventors: Alan Roy Stuart, Cincinnati, OH (US); James Michael Cosgrove, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1022 days.

(21) Appl. No.: 13/689,981

(22) Filed: Nov. 30, 2012

(65) Prior Publication Data

US 2014/0353399 A1 Dec. 4, 2014

(51) Int. Cl.
F02K 1/72 (2006.01)

(52) U.S. Cl.
CPC ............ F02K 1/72 (2013.01); *F05D 2260/50* (2013.01); *Y02T 50/672* (2013.01)

(58) Field of Classification Search
CPC ................................ F02K 1/72; F05D 2260/50
USPC ............. 60/226.2, 230; 239/265.19, 295.31; 244/110 B
See application file for complete search history.

(56) References Cited

U.S. PATENT DOCUMENTS

| | | | | |
|---|---|---|---|---|
| 3,036,431 A | * | 5/1962 | Vdolek | F02K 1/72 239/265.31 |
| 3,262,268 A | * | 7/1966 | Beavers | F02K 1/72 60/230 |
| 3,279,182 A | * | 10/1966 | Helmintoller | F02K 1/70 60/226.2 |
| 3,500,645 A | | 3/1970 | Hom | |

(Continued)

FOREIGN PATENT DOCUMENTS

| | | |
|---|---|---|
| EP | 0321993 A2 | 6/1989 |
| FR | 2379705 A1 | 9/1978 |

(Continued)

OTHER PUBLICATIONS

PCT Search Report and Written Opinion dated Mar. 18, 2014 issued in connection with corresponding PCT Application. No. PCT/US2013/066042.

(Continued)

*Primary Examiner* — Ted Kim
(74) *Attorney, Agent, or Firm* — General Electric Company; Pamela A. Kachur

(57) ABSTRACT

A thrust reverser system and operation suitable for turbofan engines. Blocker doors of the thrust reverser system have stowed positions in which each door is disposed between a fixed structure and a translating cowl of the engine. The translating cowl is translated in an aft direction of the engine to define at least one opening with the fixed structure, after which the translating cowl is further translated aft to deploy linkage mechanisms that are received in slots recessed into (Continued)

the blocker doors and pivotably connect the doors to the fixed structure. Deployment of the linkage mechanisms from the slots causes the blocker doors to rotate to a deployed position in which each door extends across a bypass duct of the engine and diverts bypass air within the duct through the opening.

14 Claims, 8 Drawing Sheets

(56) References Cited

U.S. PATENT DOCUMENTS

| | | | |
|---|---|---|---|
| 3,511,055 A * | 5/1970 | Timms | F02K 1/72 60/226.2 |
| 3,797,785 A * | 3/1974 | Baerresen | F02K 1/72 239/265.31 |
| 3,820,719 A | 6/1974 | Clark | |
| 4,145,877 A * | 3/1979 | Montgomery | F02K 1/72 60/230 |
| 4,278,220 A | 7/1981 | Johnston et al. | |
| 4,373,328 A * | 2/1983 | Jones | F02K 1/72 60/230 |
| 4,564,160 A * | 1/1986 | Vermilye | F02K 1/72 60/226.2 |
| 4,807,434 A * | 2/1989 | Jurich | F02K 1/72 60/226.2 |
| 4,865,256 A | 9/1989 | Durand et al. | |
| 4,998,409 A | 3/1991 | Mutch | |
| 5,209,057 A | 5/1993 | Remlaoui | |
| 5,722,231 A | 3/1998 | Porte | |
| 5,974,783 A | 11/1999 | Gonidec et al. | |
| 6,026,638 A * | 2/2000 | Gonidec | F02K 1/70 60/230 |
| 6,170,253 B1 | 1/2001 | Newton | |
| 6,546,715 B1 | 4/2003 | Blevins et al. | |
| 6,584,763 B2 | 7/2003 | Lymons et al. | |
| 7,874,142 B2 | 1/2011 | Beardsley | |
| 2004/0195434 A1 | 10/2004 | Parham | |
| 2008/0067287 A1 | 3/2008 | Guibert et al. | |
| 2008/0073461 A1 | 3/2008 | Guibert et al. | |
| 2008/0258016 A1 | 10/2008 | Gukeisen et al. | |
| 2009/0071122 A1 | 3/2009 | Maguire et al. | |
| 2009/0094961 A1 | 4/2009 | Stern | |
| 2010/0040466 A1 | 2/2010 | Vauchel et al. | |
| 2010/0107599 A1 | 5/2010 | Vauchel | |
| 2010/0170984 A1 | 7/2010 | Journade et al. | |

FOREIGN PATENT DOCUMENTS

| | | |
|---|---|---|
| JP | S55-137344 A | 10/1980 |
| WO | 9612881 | 5/1996 |
| WO | 2013068663 A1 | 5/2013 |

OTHER PUBLICATIONS

Notification of Reasons for Refusal issued in connection with corresponding JP Application No. 2015-545048 dated Jun. 27, 2017.

* cited by examiner

THRUST REVERSER SYSTEM WITH TRANSLATING-ROTATING BLOCKER DOORS AND METHOD OF OPERATION

BACKGROUND OF THE INVENTION

The present invention generally relates to gas turbine engines, and more particularly to thrust reverser systems utilized in high-bypass turbofan engines to provide thrust reversal by diverting air from a fan bypass duct.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a fan case 20 surrounding an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36 that surrounds the core engine 14, and exits the duct 30 through a fan exit nozzle 32. The nacelle 12 defines the radially outward boundary of the bypass duct 30, and the core cowl 36 defines the radially inward boundary of the bypass duct 30 as well as provides an aft core cowl transition surface to a primary exhaust nozzle 38 that extends aftward from the core engine 14.

The nacelle 12 is typically composed of three primary elements that define the external boundaries of the nacelle 12: an inlet assembly 12A, a fan cowl 12B interfacing with an engine fan case that surrounds the fan blades 18, and a thrust reverser system 12C located aft of the fan cowl 12B. The thrust reverser system 12C comprises three primary components: a translating cowl (transcowl) 34A mounted to the nacelle 12, a cascade 34B mounted within the nacelle 12, and blocker doors 34C shown in a stowed position radially inward from the cascade 34B. The blocker doors 34C are adapted to be pivotally deployed from their stowed position to a deployed position, in which the aft end of each blocker door 34C is pivoted into engagement with the core cowl 36 as represented in phantom in the upper half of FIG. 1. In this sense, the core cowl 36 can also be considered as a component of the thrust reverser system 12C. The cascade 34B is a fixed structure of the nacelle 12, whereas the transcowl 34A is adapted to be translated aft to expose the cascade 34B and deploy the blocker doors 34C into the duct 30 using link arms 34D, causing bypassed air within the duct 30 to be diverted through the exposed cascade 34B and thereby provide a thrust reversal effect. While two blocker doors 34C are shown in FIG. 1, a plurality of blocker doors 34C are typically circumferentially spaced around the circumference of the nacelle 12.

In a conventional thrust reverser design used in the high bypass turbofan engine 10, the cascade 34B is covered by the stowed blocker doors 34C when the thrust reverser system 12C is not in use, that is, during normal in-flight operation of the engine 10. A drawback of this type of conventional construction is that the link arms 34D associated with the blocker doors 34C extend across the fan duct flow path, increasing aerodynamic drag and other flow perturbations that can cause aerodynamic or acoustic inefficiencies. In addition, the link arms 34D are exposed to damage and wear-inducing conditions during normal engine operation. Consequently, a disadvantage associated with conventional link arms of existing thrust reverser systems is that they can reduce engine performance, engine noise attenuation, specific fuel consumption, and operational reliability.

BRIEF DESCRIPTION OF THE INVENTION

The present invention provides a thrust reverser system and operation thereof that are suitable for turbofan engines of types used in aircraft. The thrust reverser system is particularly adapted for use in a high-bypass turbofan engine having a core engine, a core cowl surrounding the core engine, a nacelle surrounding the core cowl and comprising a fan cowl, and a bypass duct defined by and between the nacelle and the core cowl.

According to a first aspect of the invention, the thrust reverser system includes a translating cowl mounted to the nacelle and adapted to translate in an aft direction of the gas turbine engine away from the fan cowl to define a circumferential opening therebetween. A fixed structure within the nacelle does not translate when the translating cowl is translated in the aft direction. Blocker doors are mounted to the nacelle to have stowed positions and deployed positions. Each blocker door has a first end, an oppositely-disposed second end, an inner surface between the first and second ends, and at least one slot recessed into the inner surface. Linkage mechanisms connect the blocker doors to the fixed structure, with each linkage mechanism comprising a first link pivotably coupled to the fixed structure and a second link pivotably coupled to one of the blocker doors. The first and second links are received in the slots recessed into the inner surfaces of the blocker doors when the blocker doors are in the stowed position. The linkage mechanisms are pivotably connected to the blocker doors so that translation of the translating cowl in the aft direction causes the first and second links to be displaced from the slots as each of the blocker doors moves to the deployed position thereof whereat each of the blocker doors extends across the bypass duct and diverts bypass air within the bypass duct through the circumferential opening.

According to a second aspect of the invention, a method of operating a thrust reverser system installed on a gas turbine engine entails stowing blocker doors in stowed positions thereof so that each blocker door is disposed between a fixed structure and a translating cowl of the engine, first ends of the blocker doors are adjacent an inner wall of the fixed structure, and second ends of the blocker doors are adjacent an inner wall of the translating cowl. The translating cowl is translated in an aft direction of the engine to define at least one circumferential opening between the fixed structure and translating cowl, after which the translating cowl is further translated in the aft direction to deploy linkage mechanisms that are received in slots recessed into radial inner surfaces of the blocker doors and pivotably connect the blocker doors to the fixed structure. Deployment of the linkage mechanisms from the slots causes each of the blocker doors to be rotated to a deployed position thereof by rotating each of the blocker doors until each of the blocker doors extends across a bypass duct of the engine and diverts bypass air within the bypass duct through the circumferential opening between the fixed structure and the translating cowl.

Other aspects of the invention include high-bypass gas turbofan engines equipped with a thrust reverser system having the elements and/or operation described above.

A technical effect of the invention is the ability of a thrust reverser system installed on the engine to operate without link arms that extend across a bypass fan duct of the engine prior to deploying blocker doors of the thrust reverser system. Instead, the link arms employed by the thrust reverser system of this invention are stowed within the blocker doors during normal engine operation, and are deployed to extend across the bypass fan duct only during deployment of the blocker door. As such, the invention is capable of significantly reducing aerodynamic drag and other flow perturbations that would be otherwise attributed to the presence of a link arm within the fan duct during normal engine operation.

Other aspects and advantages of this invention will be better appreciated from the following detailed description.

DETAILED DESCRIPTION OF THE INVENTION

Figure 2:
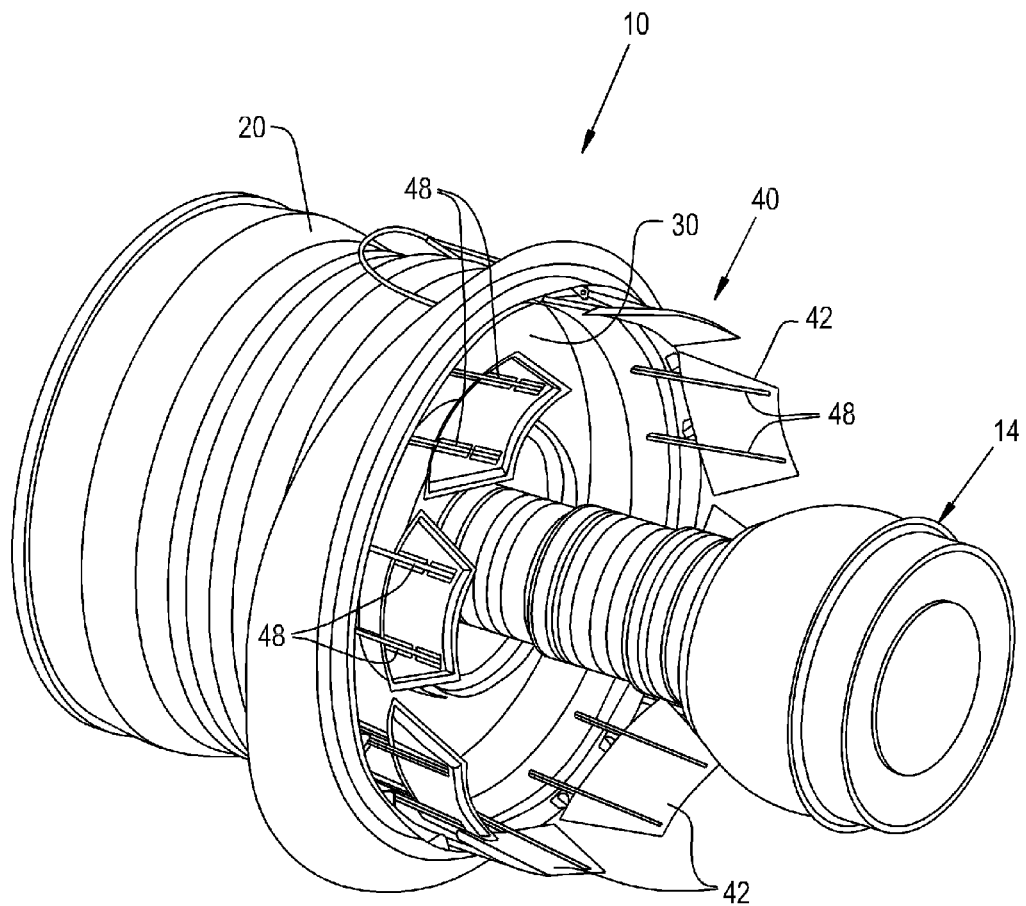
FIG. 2 represents a perspective view showing in isolation a core engine of a high-bypass turbofan engine, a fixed structure surrounding the core engine, and blocker doors pivotably coupled to the fixed structure as part of a thrust reverser system within the scope of the present invention.
Figure 3:
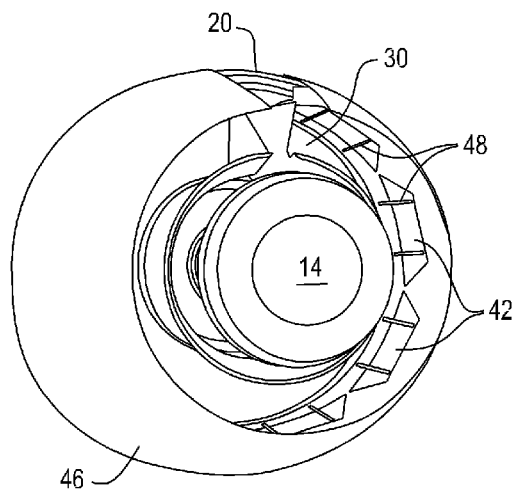
FIGS. 3 and 4 represent perspective views showing in isolation the aft end of the core engine, the fixed structure and blocker doors of FIG. 2 as well as a translating cowl surrounding the core engine aft of the fixed structure, and shows the blocker doors in fully stowed (FIG. 3) and fully deployed (FIG. 4) positions.
Figure 4:
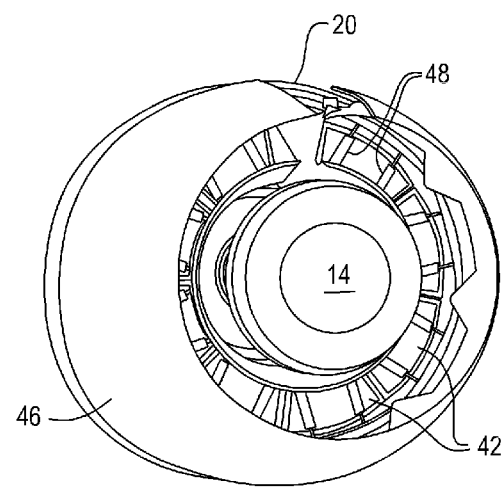
Figure 5:
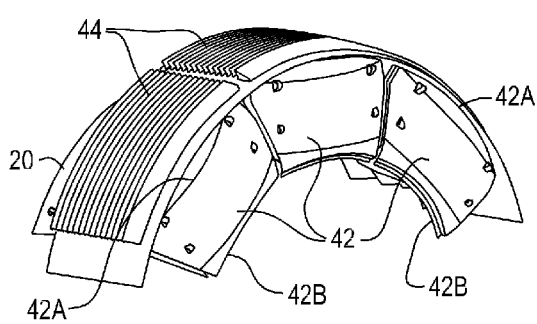
FIG. 5 represents a perspective view showing in isolation a segment of a thrust reverser system containing several blocker doors that are configured in accordance with another embodiment of the invention, and showing the blocker doors in their fully deployed positions as well as several cascades of the thrust reverser system.

FIGS. 2 through 15 represent fragmentary views of a high-bypass gas turbine (turbofan) engine and components of a thrust reverser system 40 in accordance with an embodiment of the invention. As a matter of convenience, the same reference numbers used to identify the engine 10 and certain components in FIG. 1 will be used throughout the following description, including FIGS. 2 through 15, to identify certain functionally equivalent components of the engine represented in FIGS. 2 through 15. As such, it should be understood that FIG. 2 depicts the thrust reverser system 40 as adapted to be located within a nacelle 12 (not shown in FIG. 2) of an engine 10 and aft of its fan case 20. It should be further understood that a core cowl 36 (not shown in FIG. 2) would define the radially inward boundary of a bypass duct 30 of the engine 10, the nacelle 12 defines the radially outward boundary of the bypass duct 30, and bypassed air of the engine 10 passes through the bypass duct 30. With reference to FIGS. 2, 3 and 4, it should be apparent that the thrust reverser system 40 includes blocker doors 42 adapted to be deployed into the bypass duct 30 for the purpose of diverting bypass airflow within the duct 30 through cascades 44 (FIGS. 5 through 8) that are mounted aft of the fan case 20 and exposed as a result of a translating cowl (transcowl) 46 translating in an aft direction away from the fan case 20 to define a circumferential gap or opening 66 therebetween. Other structural and functional aspects of the engine 10 can be understood from the preceding discussion of FIG. 1, and therefore will not be repeated here.

The fan case 20 represented in FIG. 2 (fragmentary views of which are also shown in FIGS. 3 through 8 and 12 through 15) and structures fixedly attached thereto generally define a fixed structure of the engine 10, which in the present discussion refers to the structure of the nacelle 12 that does not translate with the translating cowl 46. The cascades 44 are fixedly attached to or near the aft end of the fan case 20, and may also be considered to form part of the fixed structure of the nacelle 12. The cascades 44 circumscribe the bypass duct 30 and are represented as being made up of a plurality of individual cascade segments. As the aft-most section of the nacelle, it should be understood that the translating cowl 46 would be located aft of the fan cowl 12B and circumscribe the core cowl 36 shown in FIG. 1. As known in the art, any suitable type of actuator (not shown) can be employed to cause the translating cowl 46 to translate away from and toward the fan case 20. The actuating means can be, though are not required to be, directly coupled to the fan case 20 or a bulkhead within the nacelle 12.

FIGS. 2 through 4 and 12 through 15 represent blocker doors 42 configured in accordance with one embodiment of the invention, while FIGS. 5 through 11 represent blocker doors 42 configured in accordance with another embodiment of the invention. Due to the functional and structural similarities of the doors 42 of these embodiments, the following discussion will encompass both embodiments and note any differences if and when appropriate.

Figure 6:
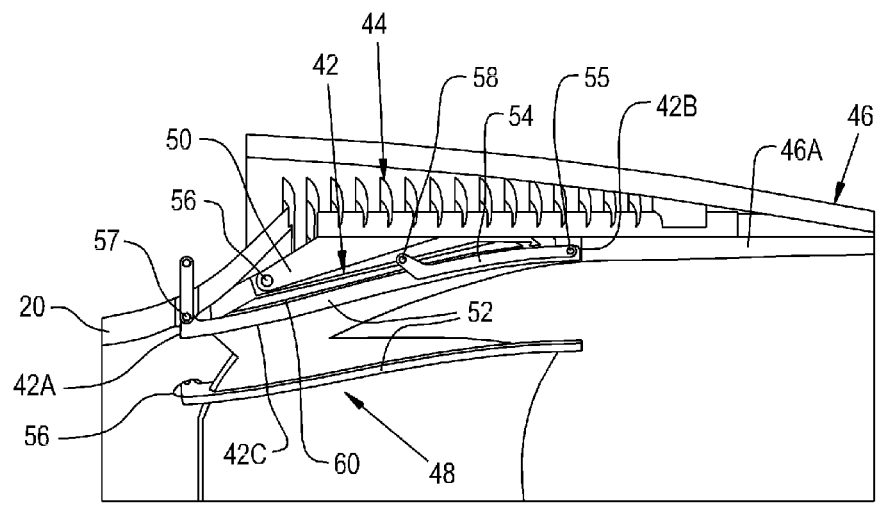
FIGS. 6 through 8 are axial (side) sectional views showing the thrust reverser system of FIG. 5 transitioning from the stowed position to the fully deployed position with the assistance of a linkage mechanism that couples the blocker doors to the fixed structure and translating cowl.

As seen in FIG. 6, in the fully stowed position each blocker door 42 is disposed between a diverter fairing 20A (fixedly attached to the fan case 20) and the translating cowl 46 so that a forward end 42A of each door 42 is adjacent and may contact the diverter fairing 20A, an oppositely-disposed aft end 42B of the door 42 is adjacent and may contact an inner wall 46A of the translating cowl 46, and the radially inner surfaces 42C of the doors 42 cooperate with radially inner surfaces of the diverter fairing 20A and cowl wall 46A to define portions of a continuous radially outer flow surface of the bypass duct 30.

Figure 1:
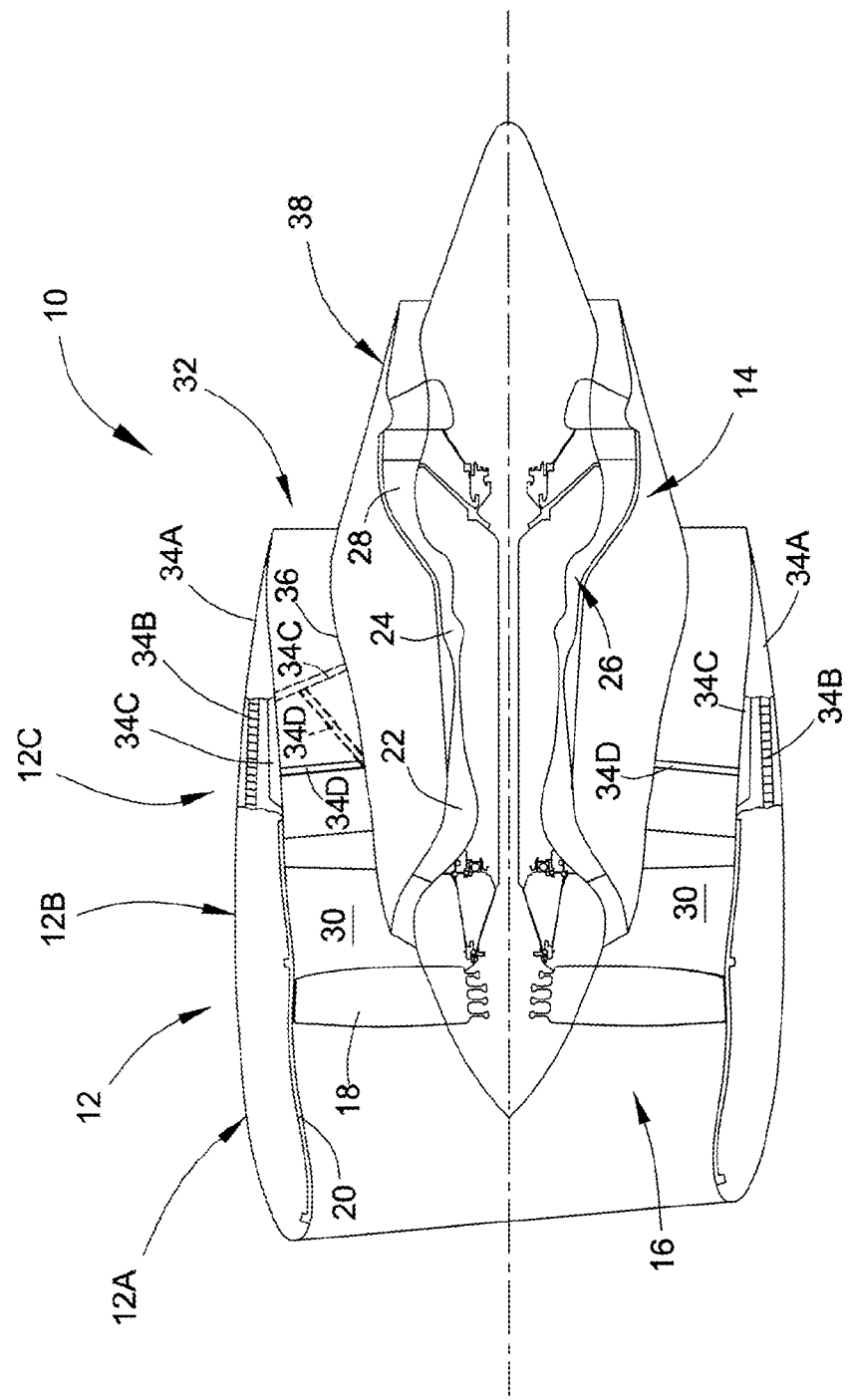
FIG. 1 schematically represents a cross-sectional view of a high-bypass turbofan engine.

Notably absent from the views of the engine 10 shown in FIGS. 2 through 15 are link arms such as of the type that connect the blocker doors 34C to the core cowl 36 in FIG. 1. Instead, and as particularly evident from FIGS. 2 through 8, each blocker door 42 is adapted to be deployed from a stowed position (FIGS. 2, 3 and 6) to a fully deployed position (FIGS. 4, 5 and 8) through a linkage mechanism 48 that is coupled to the fixed structure (diverter fairing 20A), but not to the core cowl 36. As such, the linkage mechanisms 48 do not extend across the bypass duct 30 during normal engine operation, and are not required to extend into the bypass duct 30 except during deployment of the blocker doors 42. Furthermore, the embodiment shown in the drawings show the linkage mechanism 48 as also not being directly connected to the translating cowl 46.

Figure 7:
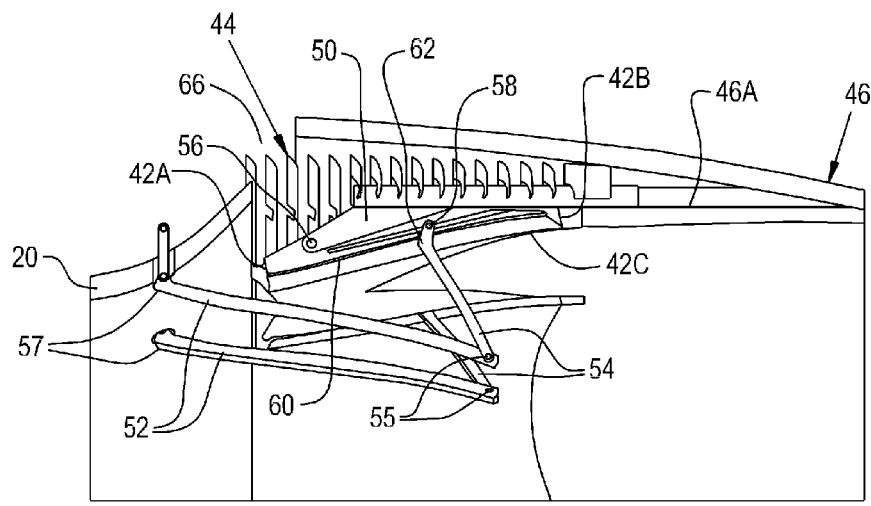
Figure 8:
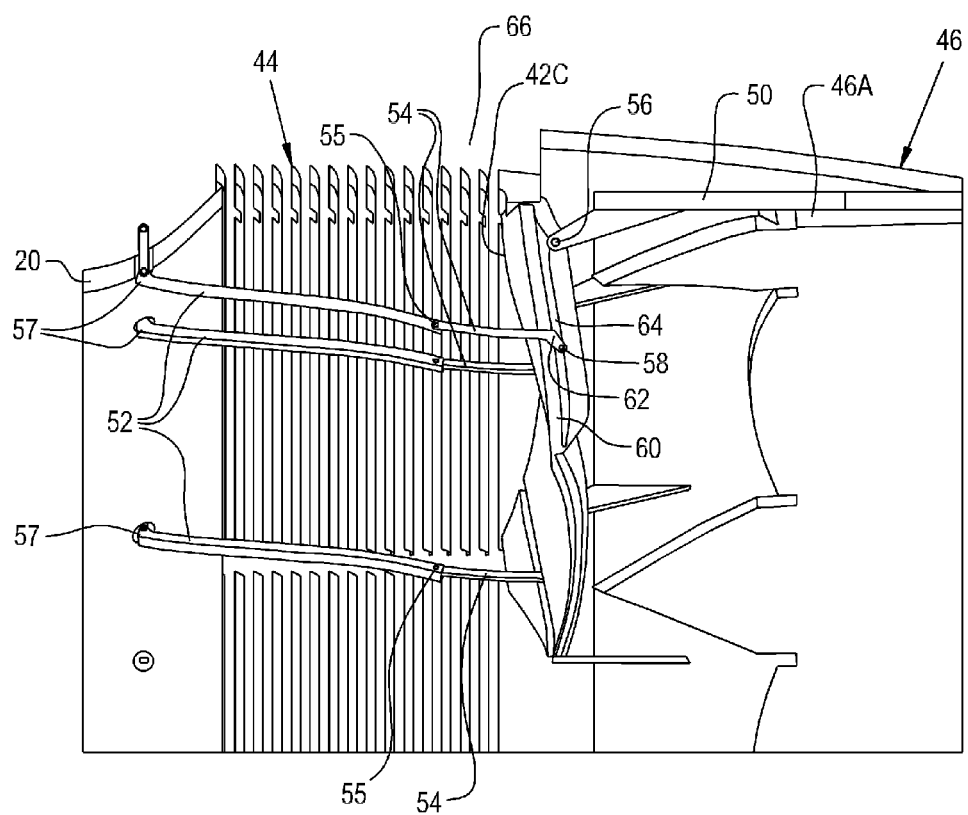

The linkage mechanisms 48 are preferably adapted to allow the blocker doors 42 to initially translate in unison with the translating cowl 46 in the aft direction of the engine 10 (FIG. 7), after which the blocker doors 42 rotate into the bypass duct 30 (FIG. 8) to divert bypassed air within the duct 30 through the cascades 44 to provide a thrust reversal effect. For this purpose, FIGS. 6 through 8 represent the blocker doors 42 as pivotally coupled to the translating cowl 46 through pivot connections 56 that are completely separate from the linkage mechanism 48. In the embodiment of FIGS. 6 through 8, the pivot connections 56 pivotally couple the forward ends 42A of the blocker doors 42 to brackets 50 that extend forward of the inner wall 46A of the translating cowl 46. Aside from its pivoting connections 56 to the translating cowl 46, each blocker door 42 is pivotally connected to the fixed structure of the nacelle 12 (the diverter fairing 20A) through one or more of the linkage mechanisms 48. In the embodiments of FIGS. 2 through 15, each blocker door 42 is operated with two sets of linkage mechanisms 48 and each mechanism 48 comprises a pair of link arms 52 and 54 that are preferably pivotably coupled directly to each other by a pivoting connection 55. The link arm 52 is also pivotably coupled by a pivoting connection 57 to the diverter fairing 20A or another suitable part of the fixed structure of the nacelle 12, while the second link arm 54 is pivotably coupled by a pivoting connection 58 to the blocker door 42.

Figure 13:
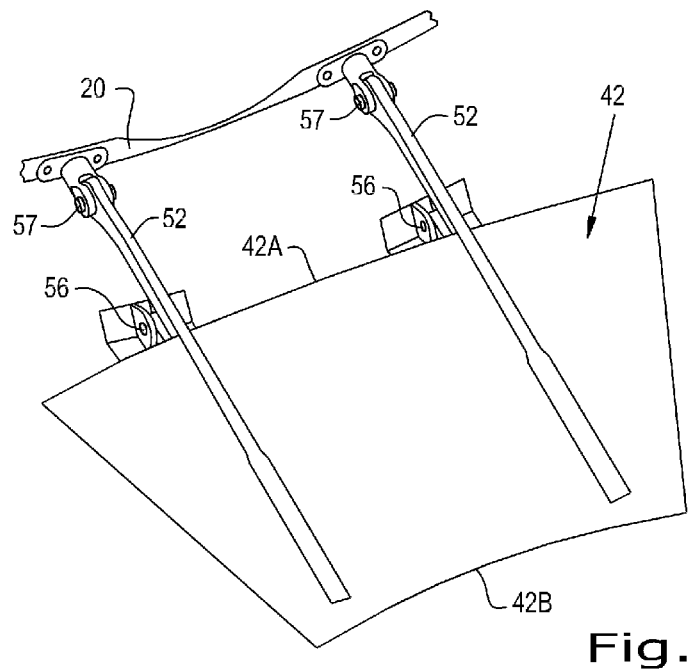

From FIGS. 6 and 13, it can be seen that each coupled pair of link arms 52 and 54 is received within a recess 60 defined in the radially inner surface 42C of its door 42, preferably so that the link arms 52 and 54 are entirely contained within their recess 60 and do not protrude into the bypass duct 30 when the doors 42 are fully stowed. An advantage of this configuration is that, in contrast to the link arms 34D of FIG. 1, the link arms 52 and 54 are not exposed to damage and wear-inducing conditions during normal engine operation, and do not cause aerodynamic drag that would have a negative impact on engine performance and specific fuel consumption. The recessing of the arms 52 and 54 into the blocker doors 42 also provides the advantage of reducing the radial thickness of the translating cowl 46 that would otherwise be required to accommodate the linkage mechanism 48, and therefore avoids the consequent drag and pressure drop penalties associated with relatively thick translating cowls.

In the stowed position depicted in FIG. 6 it can be appreciated that, with the translating cowl 46 in its forward stowed position, the pivoting connection 56 between the bracket 50 and the forward end 42A of a blocker door 42 applies a forward-acting force on the door 42, which in turn forces the link arms 52 and 54 radially outward toward the door 42, such that the arms 52 and 54 are received in the slots 60 and the arms 52 and 54 help to secure the door 42 in its deployed position. From FIGS. 6 and 7, it can be seen that the initial translation of the translating cowl 46 in the aft direction causes the blocker doors 42 to translate in unison with the cowl 46, whereas FIG. 8 shows that further translation of the cowl 46 causes the blocker doors 42 to be deployed into the bypass duct 30, preferably so that the aft ends 42B of the doors 42 contact or nearly contact the core cowl 36 (not shown). As such, movement of the blocker doors 42 preferably includes at least two distinct phases during deployment of the thrust reverser system 40. During the initial phase (FIG. 7), through its connection 56 to the bracket 50 associated with the translating cowl 46, each blocker door 42 translates aftward with the translating cowl 46 relative to the fan case 20 without any required rotational movement between the doors 42 and translating cowl 46. During this phase, the link arms 52 and 54 are deployed from their slots 60 in the inner surface 42C of their respective blocker doors 42, with the result that the doors 42 are no longer secured or supported by the arms 52 and 54 in the translated position shown in FIG. 7. Instead, the doors 42 may be maintained in the radially outward position seen in FIG. 7 by other means, for example, springs associated with the pivoting connections 55, 56, 57 and/or 58 and/or the effect of bypass air flowing through the bypass duct 30 (aero loads). As a nonlimiting example, FIGS. 6 through 8 schematically depict biasing devices 70 located at the connections 57. The biasing devices 70, which may be springs or other devices capable of applying preloads to the link arms 52, also have the desirable effect of snubbing the doors 42 in the fully stowed position to avoid wear induced by engine vibration. During the later deployment phase, with further aftward movement of its forward end 42A coupled to the brackets 50, each door 42 is caused to pivot about its forward end 42A as a result of a heel 62 or other suitable prominent feature on the link 54 engaging a stop 64 on the door 42, for example, the bottom of the slot 60, preventing further pivoting of the link 54 relative to the door 42 with the result that further aftward translation of its forward end 42A forces the door 42 to move and rotate radially inward toward the core cowl 36 until each door 42 assumes its fully deployed position and extends across the radial width of the duct 30. The deployed blocker doors 42 may but are not required to extend entirely across the radial width of the duct 30 so that their aft ends 42B contact the core cowl 36. As evident from FIG. 8, as bypassed air within the duct 30 encounters the blocker doors 42, the air is diverted by the doors 42 and expelled through the cascades 44. Following the deployment cycle described above, a stow cycle can be initiated by translating the translating cowl 46 in the forward direction toward the fan case 20, during which each blocker door 42 rotates into its translated position (FIG. 7) under aero loads and as allowed by the heel-stop contact, and then translates to its stowed position with further forward movement of the translating cowl 46.

Figure 9:
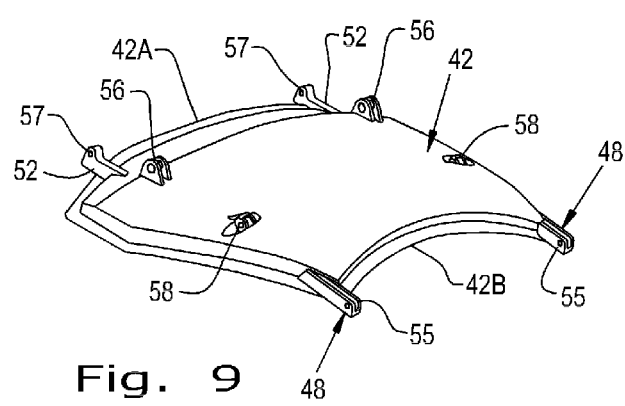
FIGS. 9 through 11 are perspective views showing in isolation one of the blocker doors of FIGS. 5 through 8 and its linkage mechanism transitioning from the stowed position (FIG. 9) to a translated position (FIG. 10) and finally a fully deployed position (FIG. 11).
Figure 10:
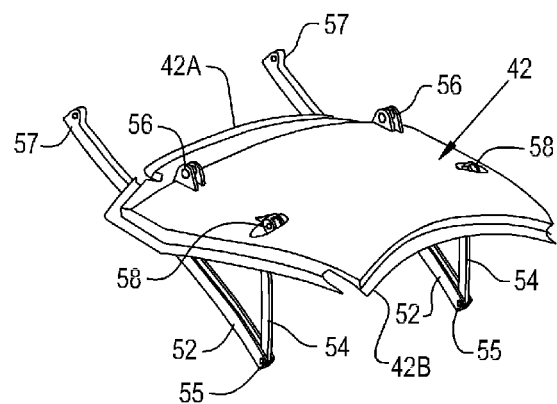
Figure 11:
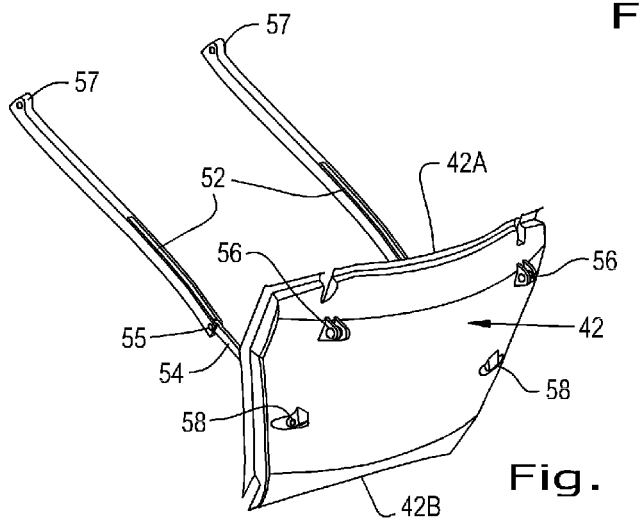

FIGS. 9 through 11 provide additional perspective views showing one of the blocker doors 42 of FIGS. 5 through 8 and its linkage mechanisms 48 in isolation. FIGS. 9 through 11 represent the door 42 and its linkage mechanisms 48 transitioning from the stowed position (FIG. 9) to a translated position (FIG. 10) and finally a fully deployed position (FIG. 11). As evident from FIGS. 9 through 11, structural features for the connections 56 and 58 can be physically incorporated into the material that forms each blocker door 42.

FIGS. 12 through 15 are perspective views showing in isolation one of the blocker doors 42 and linkage mechanisms 48 that are consistent with the embodiment of FIGS. 2 through 4. In addition to the doors 42 of FIGS. 2 through 4 and 12 through 15 having a different shape and profile as compared to the blocker doors 42 of FIGS. 5 through 11, the structural features for the connections 56 and 58 are represented in FIGS. 2 through 4 and 12 through 15 as provided by discrete components 68 that are assembled to the blocker doors 42.

Figure 12:
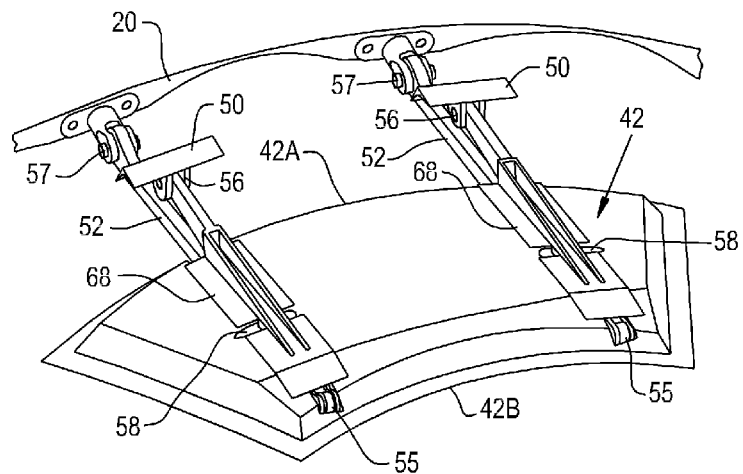
FIGS. 12 and 13 are perspective views showing in isolation two diametrically opposed blocker doors and their linkage mechanisms of FIGS. 2 through 4, wherein the views are taken from a viewpoint looking forward and toward the axis of the engine and show the blocker doors and linkage mechanisms in a stowed position.
Figure 14:
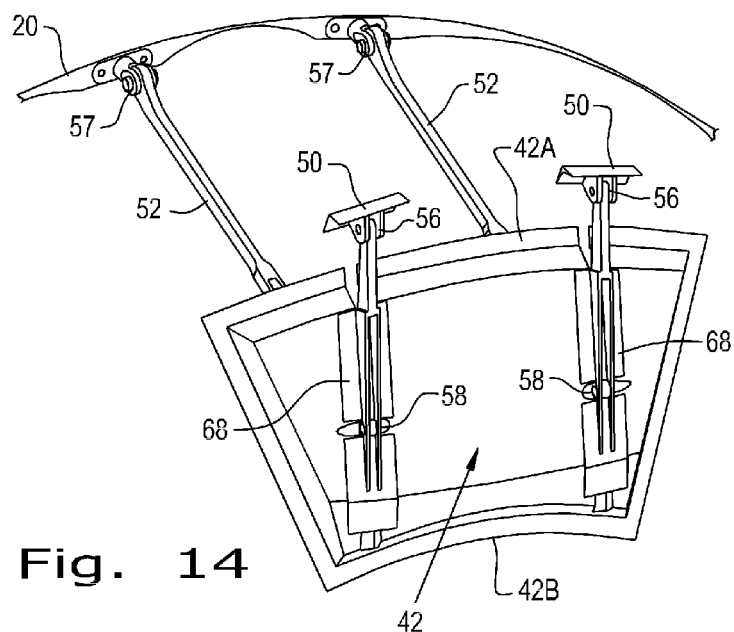
FIG. 14 is a perspective view of the blocker door and linkage mechanisms of FIG. 12 in a fully deployed position, taken from a viewpoint looking generally forward.
Figure 15:
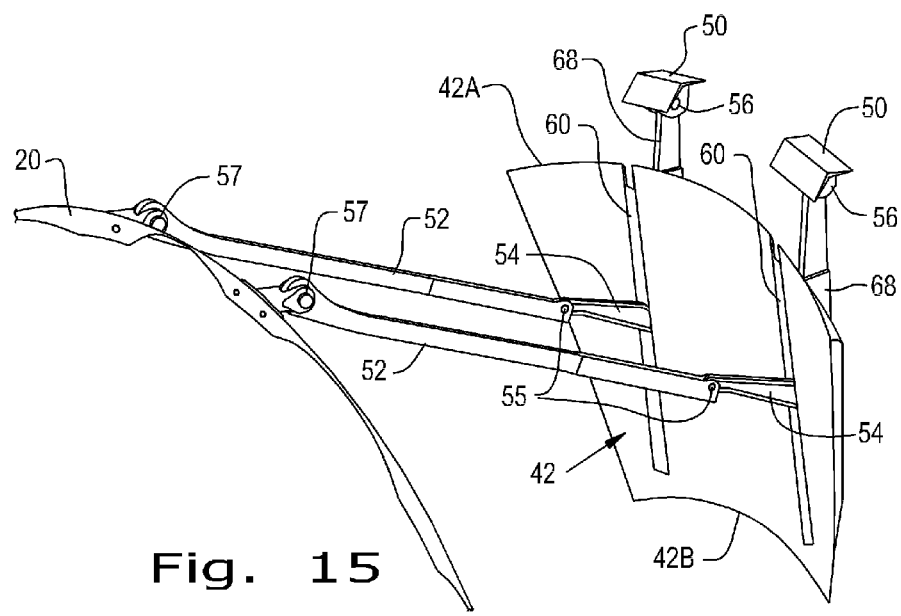
FIG. 15 is a perspective view of the blocker door and linkage mechanism of FIG. 14 taken from a viewpoint looking generally aftward.

FIGS. 12 and 13 are perspective views of two stowed diametrically-opposed blocker doors 42 and their linkage mechanisms 48 taken from a viewpoint looking approximately forward and toward the axis of the engine 10 (not shown). As particularly evident from FIG. 13, each linkage mechanism 48 and its corresponding recess 60 can be complementarily shaped and sized so that the mechanism 48 is entirely accommodated within the recess 60 and its link arms 52 and 54 are stored flush with the surrounding surface 42C of the door 42. FIG. 14 is another perspective view taken from a viewpoint looking generally forward and showing in isolation a blocker door 42 and its linkage mechanisms 48 in the fully deployed position, while FIG. 15 is a perspective view of the same blocker door 42 and linkage mechanism 48 taken from a viewpoint looking generally aftward.

From the above discussion and depictions in FIGS. 2 through 15, it should be appreciated that the translational-rotational motion of the blocker doors 42 is not dependent on any particular type of cascade design, aside from the requirement that the cascades 44 are capable of turning the air flow within the bypass duct 30 diverted by the blocker doors 42. Furthermore, whereas the blocker doors 42 represented in FIGS. 2 through 15 have rigid constructions that do not intentionally bend, flex or fold during deployment, blocker doors 42 having any of these capabilities are also within the scope of the invention. Finally, it should also be appreciated that the thrust reverser system 40 and its individual components can be constructed of various materials, including metallic, plastic and composite materials commonly used in aerospace applications and fabricated by machining, casting, molding, lamination, etc., and combinations thereof.

While the invention has been described in terms of a specific embodiment, it is apparent that other forms could be adopted by one skilled in the art. For example, the engine 10, the thrust reverser system 40, and their components could differ in appearance and construction from the embodiment shown in the figures, the functions of each component of the thrust reverser system 40 could be performed by components of different construction but capable of a similar (though not necessarily equivalent) function, and various materials could be used in the construction of these components. Therefore, the scope of the invention is to be limited only by the following claims.

The invention claimed is:

1. A thrust reverser system for a gas turbine engine having a core engine, a core cowl surrounding the core engine, a nacelle surrounding the core cowl and comprising a fan cowl, and a bypass duct defined by and between the nacelle and the core cowl, the thrust reverser system comprising:
    a translating cowl mounted to the nacelle and adapted to translate in an aft direction of the gas turbine engine away from the fan cowl to define a circumferential opening therebetween;
    a fixed structure within the nacelle that does not translate when the translating cowl is translated in the aft direction;
    blocker doors mounted to the nacelle and having stowed positions and deployed positions, each of the blocker doors having a first end, an oppositely-disposed second end, a radially inner surface between the first and second ends, and at least one slot recessed into the radially inner surface; and
    linkage mechanisms connecting the blocker doors to the fixed structure, each of the linkage mechanisms comprising a first link pivotably coupled to the fixed structure and a second link pivotably coupled to one of the blocker doors, the first and second links being received in the slots recessed into the radially inner surfaces of the blocker doors when the blocker doors are in the stowed position, the linkage mechanisms being pivotably connected to the blocker doors so that translation of the translating cowl in the aft direction causes the first and second links to be displaced from the slots as each of the blocker doors moves to the deployed position thereof whereat each of the blocker doors extends across the bypass duct and diverts bypass air within the bypass duct through the circumferential opening;
    wherein the linkage mechanisms consist of the first and second links, first pivotal connections that pivotably couple the first and second links to each other, second pivotal connections that pivotably couple the first links to the fixed structure, and third pivotal connections that pivotably couple the second links to the blocker doors.

2. The thrust reverser system according to claim 1, wherein the linkage mechanisms and the translating cowl cooperate so that the blocker doors initially translate aft with the translating cowl so as not to project into the bypass duct and thereafter rotate to extend across the bypass duct.

3. The thrust reverser system according to claim 2, wherein at least one of the second links associated with each of the blocker doors comprises a feature that engages the blocker door to which the second link is pivotably coupled to cause the blocker door to rotate.

4. The thrust reverser system according to claim 3, wherein the linkage mechanisms and the blocker doors are configured so that air flow through the bypass duct inhibits rotation of the blocker doors until the features of the second links engage the blocker doors.

5. The thrust reverser system according to claim 1, further comprising means associated with the linkage mechanisms for biasing the blocker doors toward the stowed positions thereof.

6. The thrust reverser system according to claim 1, wherein the first ends of the blocker doors are pivotably coupled to the translating cowl.

7. The thrust reverser system according to claim 1, wherein the blocker doors are not pivotably coupled to the core cowl.

8. The thrust reverser system according to claim 1, wherein the first and second links are completely received in the slots when the blocker doors are in the stowed positions thereof.

9. The thrust reverser system according to claim 1, wherein the first and second links do not to protrude into the bypass duct when the blocker doors are in the stowed positions thereof.

10. The thrust reverser system according to claim 1, wherein the circumferential opening comprises a cascade.

11. A thrust reverser system installed in a high-bypass turbofan engine having a core engine, a core cowl surrounding the core engine, a nacelle surrounding the core cowl and comprising a fan cowl, and a bypass duct defined by and between the nacelle and the core cowl, the thrust reverser system comprising:
    a translating cowl mounted to the nacelle and adapted to translate in an aft direction of the high-bypass turbofan engine away from the fan cowl to define a circumferential opening therebetween, the translating cowl having a radially inner wall that defines a first portion of a radially outer flow surface of the bypass duct;
    a fixed structure within the nacelle that does not translate when the translating cowl is translated in the aft direction, the fixed structure comprising a radially inner wall that defines a second portion of the radially outer flow surface of the bypass duct, the fixed structure comprising at least one cascade that is exposed to the bypass duct when the translating cowl is translated in the aft direction and through which bypass air within the bypass duct is diverted when the translating cowl is translated in the aft direction;

blocker doors mounted to the nacelle and having stowed positions and deployed positions, each of the blocker doors having a first end pivotably coupled to the translating cowl, an oppositely-disposed second end, a radially inner surface between the first and second ends, and at least one slot recessed into the radially inner surface, the blocker doors being disposed between the fixed structure and the translating cowl so that when in the stowed position the first ends thereof are adjacent the inner wall of the fixed structure, the second ends thereof are adjacent the inner wall of the translating cowl, and the radially inner surfaces thereof define a third portion of the radially outer flow surface of the bypass duct that is continuous with the first and second portions of the radially outer flow surface defined by the translating cowl and the fixed structure; and linkage mechanisms connecting the blocker doors to the fixed structure but not to the translating cowl or the core cowl, each of the linkage mechanisms consist of first and second links, first pivotal connections that pivotably couple the first and second links to each other, second pivotal connections that pivotably couple the first links to the fixed structure, and third pivotal connections that pivotably couple the second links to the blocker doors, the first and second links being completely received in the slots recessed into the radially inner surfaces of the blocker doors so as not to protrude into the bypass duct when the blocker doors are in their stowed positions, the linkage mechanisms being pivotably connected to the blocker doors so that translation of the translating cowl in the aft direction causes the first and second links to be displaced from the slots as each of the blocker doors moves to the deployed position thereof whereat each of the blocker doors extends across the bypass duct and diverts bypass air within the bypass duct through the cascade of the fixed structure.

12. The thrust reverser system according to claim 11, wherein the linkage mechanisms and the translating cowl cooperate so that the blocker doors initially translate aft with the translating cowl so as not to project into the bypass duct and thereafter rotate to extend across the bypass duct.

13. The thrust reverser system according to claim 12, wherein each of the second links comprises a feature, each of the blocker doors comprises a stop, and the features of the second links engage the stops of the blocker doors to cause the blocker doors to rotate.

14. The thrust reverser system according to claim 13, wherein the linkage mechanisms and the blocker doors are configured so that air flow through the bypass duct inhibits rotation of the blocker doors until the features of the second links engage the stops of the blocker doors.

* * * * *